United States Patent [19]

Bobel, II et al.

[11] 4,221,053

[45] Sep. 9, 1980

[54] INSPECTION APPARATUS

[75] Inventors: Robert J. Bobel, II; Richard H. Blausey, Jr.; Edward D. Floyd; Donald B. Hopings, all of Toledo; Russell C. Retzloff, Maumee; Andrew W. Rudolph, Elmore, all of Ohio

[73] Assignee: Libbey-Owens-Ford Company, Toledo, Ohio

[21] Appl. No.: 959,631

[22] Filed: Nov. 13, 1978

[51] Int. Cl.³ .............................................. G01B 7/28
[52] U.S. Cl. .............................. 33/174 L; 33/174 P; 33/172 E; 33/DIG. 2
[58] Field of Search ........... 33/174 L, 172 E, DIG. 2, 33/DIG. 5, 174 P

[56] References Cited

U.S. PATENT DOCUMENTS

| | | | |
|---|---|---|---|
| 3,733,704 | 5/1973 | Iarabaugh | 33/174 L |
| 3,855,708 | 12/1974 | Tann et al. | 33/174 L |

Primary Examiner—Willis Little
Attorney, Agent, or Firm—Collins, Oberlin & Darr

[57] ABSTRACT

An inspection apparatus for determining the contours of sheet material, particularly glass sheets, comprising a checking fixture having a plurality of probe assemblies for determining the exact position of points along the sheet and the deviation, if any, of such measured points from reference points constituting the ideal contour. The probe assemblies generate linear signals transmitted to a controller which, in turn, converts such signals into data displayed on a video screen in selectively different forms.

20 Claims, 7 Drawing Figures

INSPECTION APPARATUS

BACKGROUND OF THE INVENTION

The present invention relates generally to the inspection of sheet material and, more particularly, to an improved apparatus for accurately and rapidly determining the contours of bent glass sheets.

Bent sheets of glass are commonly used as glazing closures for vehicles such as automobiles and the like. For such applications, the glass sheets must be bent to precisely defined curvatures or contours dictated by the configuration and size of the opening and the overall styling of the vehicle. In order to determine the accuracy of the shape imparted to the sheets, it has been customary to employ a checking fixture which is formed with a surface conforming to the contour desired in the glass sheets. A bent sheet to be inspected is placed upon the contoured surface of the fixture and, if in agreement or conformity therewith, is found to be acceptable. However, if the sheet is found to be "off-form", various arrangements have been employed to determine whether the deviation from the desired or ideal contour is within allowable tolerances. One simple process involved the insertion of feeler gauges at intervals between the marginal edge portions of the sheet and the surface of the checking fixture to ascertain whether the clearance therebetween was acceptable. It can be appreciated that this was a tedious and slow process, subject to errors in judgment and, because of modern-day production output on the order of about six bent pieces per minute, allowed the inspection of only a fraction of the finished pieces. Moreover, this procedure determined only whether the sheet being checked was acceptable or unacceptable, without any indication of the precise contour thereof.

Other known techniques that were somewhat more sophisticated employed a plurality of air actuated probes located about the marginal edge of the fixture and which projected through the surface of the fixture for engaging the underside of the sheet when placed on a form to indicate whether the deviation, if any, at spaced points along the marginal edge of the bent sheets fell within or beyond tolerable limits. The vertical positions of the several probes were determined by measuring back pressures from the sensors, which were connected to a system of lights and audible alarms that were actuated if any area of the sheet did not fall within acceptable tolerances. While such sensors were an improvement over the manual checking procedure, they were not completely satisfactory in that the data from such sensors depended upon the air back pressure and the resulting signals were non-linear, causing any deviation to be amplified. Also, as with the feeler gauges mentioned above, such devices determined only whether or not the bent sheet fell within acceptable or unacceptable limits and could not give an accurate representation of the actual contour of the glass periphery.

Still another known checking practice involves the use of linear potentiometers as sensing probes to more accurately ascertain the actual contour of the sheet being inspected. However, this known technique requires calibration of each probe sensor, one after another, to arrive at an ideal or desired contour when preparing the fixture for glass inspection. Not only must this be done each time a production run of differently contoured sheets is made, but also periodically during production in order to ensure accuracy with consequent production down-time and increased production costs.

SUMMARY OF THE INVENTION

Accordingly, it is an object of the present invention to obviate the above-noted shortcomings of the prior art by providing a new and improved apparatus for inspecting sheet material to precisely determine the contour thereof and the degree of conformity to a desired or ideal contour.

Another object of this invention is to provide in the foregoing apparatus a plurality of novel sensing probe assemblies, each comprised of separable components coacting as a unit in operation but which can be individually removed for easy replacement and/or maintenance.

Still another object of the present invention is to calibrate all of the probes of the foregoing inspection apparatus simultaneously in accordance with a desired contour.

A further object of this invention is to provide an inspection apparatus incorporating a micro-computer for processing the signals derived from the sensing probes into information selectively displayed in a plurality of different forms.

Further and more detailed objects and advantages of the invention will become clearly apparent in the course of the following detailed description of an illustrative embodiment thereof, when taken in connection with the accompanying drawings wherein like reference characters denote like parts throughout the various views.

DESCRIPTION OF THE PREFERRED EMBODIMENT

Figure 1:
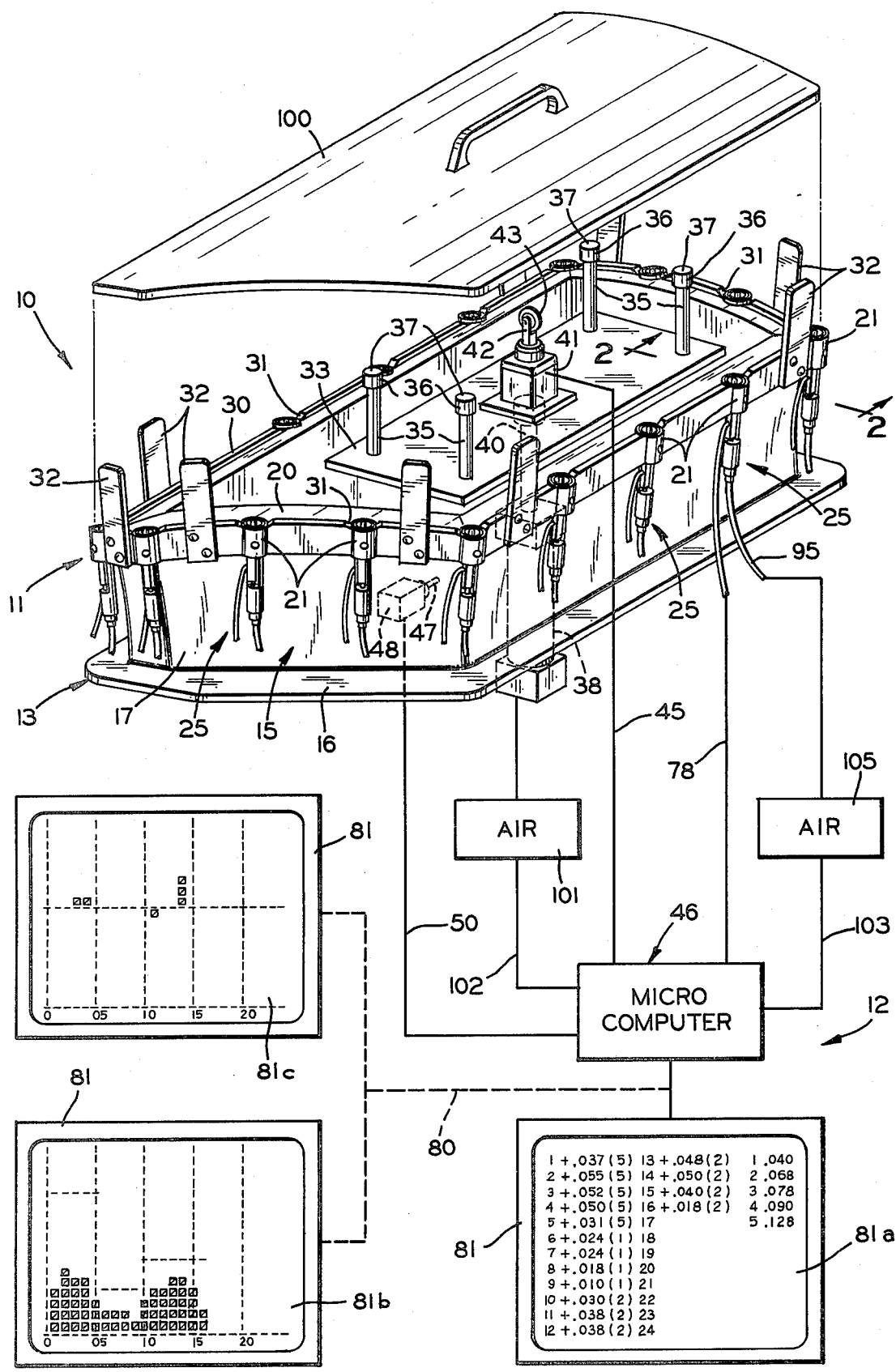
FIG. 1 is a perspective view of an inspection apparatus constructed in accordance with this invention and schematically showing the control and visual display used in conjunction therewith.

Referring now in detail to the illustrative embodiment depicted in the accompanying drawings, there is shown in FIG. 1 an inspection apparatus constructed in accordance with the present invention and comprehensively designated 10, adapted to be used, but not restricted thereto, in conjunction with a bending and/or tempering furnace employed in the production of bent glass sheets. When used in this manner, the inspection apparatus 10, which consists primarily of a checking fixture, generally designated 11, and a computer/control system, generally designated 12, is located at or adjacent the exit end of the furnace so that the shape or contour imparted to the glass sheets can be rapidly and efficiently checked either as an "in-line" operation whereby the apparatus 10 is located in the path of oncoming bent sheets or an "off-line" operation whereby the bent sheets are removed, either manually or automatically, from the production line at the exit end thereof and placed onto the checking fixture 11 of inspection apparatus 10. While apparatus 10 of this invention will be described in connection with the inspection of bent glass sheets, it should be understood that such apparatus is in no way limited thereto, but has utility in any sheet material application where it is desired to determine the precise contour of a sheet product and/or compare the shape of the latter to a desired or ideal contour.

Figure 2:
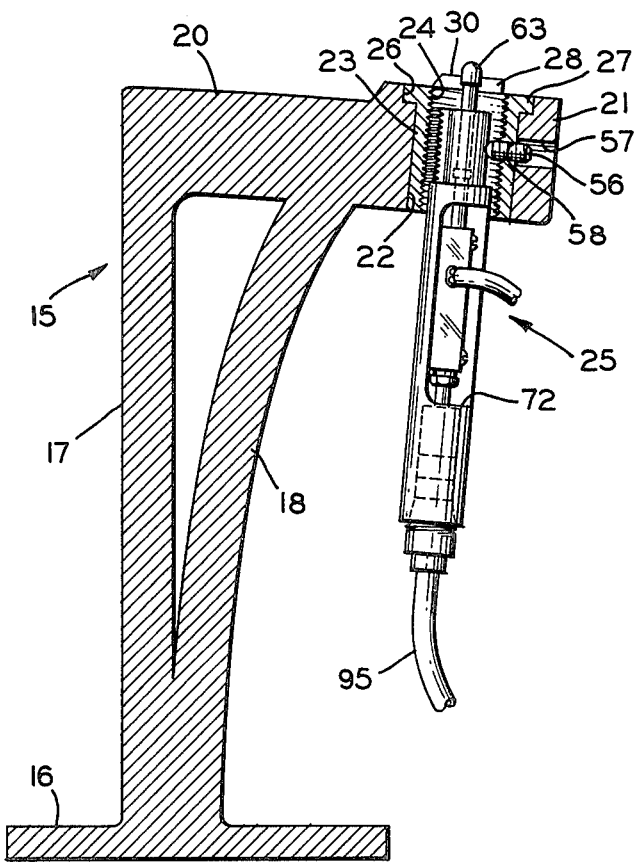
FIG. 2 is a vertical sectional view, on an enlarged scale, taken along line 2—2 of FIG. 1 and showing the mounting arrangement of one of the novel sensing probes of the present invention.

In either event, the checking fixture 11 is supported on a suitable frame or bed (not shown) and comprises a base member 13 having a peripheral side wall 15 provided at its lower end with a marginal flange 16 projecting laterally outwardly and inwardly from either side of wall 15 and which is adapted to be secured to the bed. As best shown in FIG. 2, side wall 15 includes an inner straight vertical portion 17 and an outer curved portion 18 which extends upwardly from flange 16 and gradually curves outwardly in a diverging relation from vertical wall portion 17. The upper ends of wall portions 17 and 18 are connected to a common, horizontally extending top wall 20 projecting laterally outwardly in cantilevered fashion past the outer curved wall portion 18.

The outer edge of top wall 20 is formed with spaced, arcuately shaped protrusions 21 to provide adequate mass for the formation of spaced bores 22 extending through the top wall 20 adjacent the marginal edge thereof. These bores 22 accommodate inserts 23 having threaded bores 24 therethrough adapted to adjustably receive the probe assemblies, generally designated 25, constructed in accordance with this invention and which will be hereinafter more fully described. Each bore 22 is counterbored, as at 26 in FIG. 2, to receive the flange 27 of insert 23 and dispose the upper surface of insert flange 27 flush with the upper surface of top wall 20.

A rail 28 is formed on the upper surface of top wall 20 and conforms generally in outline to the sheets to be inspected. The rail 28 is formed with an upper contoured checking surface 30 conforming precisely to the ideal contour desired or the exact contour intended to be imparted to the bent sheet. The rail is interrupted to form gaps 31 (FIG. 1) to provide the necessary clearance for the probe assembly 25 when extended. Of course, the specific contour of surface 30 is representative of only one desired contour and it should be appreciated that the contour of such surface can vary widely, as dictated by the desired contoured shape to be imparted to the glass sheet to be inspected.

A plurality of upright plates or guide brackets 32 are releasably secured to the outer edge of top wall 20 adjacent the corners thereof to facilitate placement of the glass sheets to be inspected on the checking fixture 11.

A vertically reciprocal platen 33 of generally rectangular configuration in plan is located within the confines of checking fixture side wall 15 and is provided with vertically extending rods 35 rigidly secured at their lower ends to platen 33 adjacent the corners thereof, respectively. These rods 35 are provided with enlarged heads 36 having upper glass engaging surfaces 37 upon which the glass sheet to be inspected is initially placed. Means for lowering and raising the platen 33 includes a pneumatic cylinder 38 mounted on the fixture 11 and having the usual reciprocal piston (not shown) suitably connected to a piston rod 40 connected at its distal end to the underside of platen 33.

A limit switch 41 is mounted centrally on platen 33 and is provided with a plunger 42 carrying a glass contacting activator 43 in the form of a roller thereon. The switch 41 is connected by a conductor lead 45 to a control-computer device, hereinafter referred to as "controller" 46, which in turn controls, among other control and computer functions, actuation of the cylinder 38 as will be more fully described in connection with the operation of inspection apparatus 10. Suffice it to say that the placement of a glass sheet on the rods 35 of platen 33 also engages the activator 43 to depress plunger 42 and actuate switch 41 and, via controller 46, initiate lowering of the platen 33. As the platen 33 moves downwardly past the rail contoured surface 30, it deposits the glass sheet thereon and continues to descend therebeneath. When platen 33 reaches the end of its downstroke, it engages the actuator 47 of a limit switch 48 suitably mounted on the fixture 11 to, via conductor lead 50 and controller 46, initiate actuation of probe assemblies 25, as will hereinafter be described.

Figure 3:
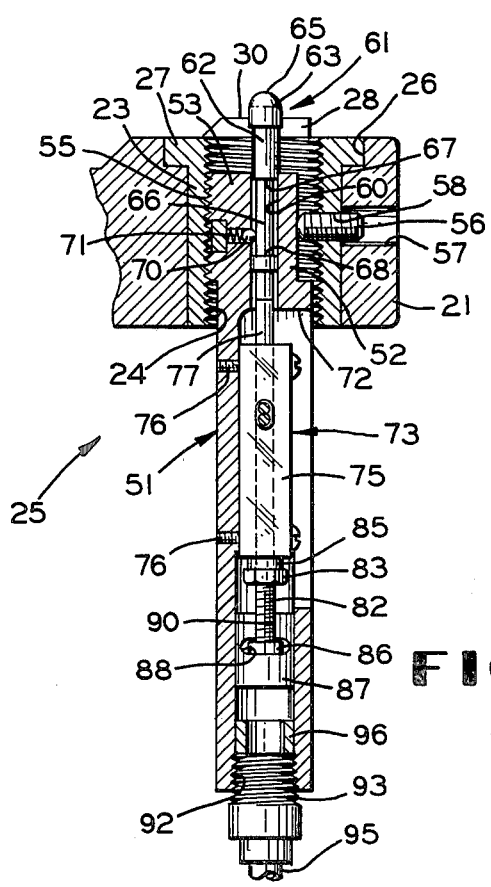
FIG. 3 is a longitudinal sectional view, on an enlarged scale, of the sensing probe constructed in accordance with this invention.
Figure 4:
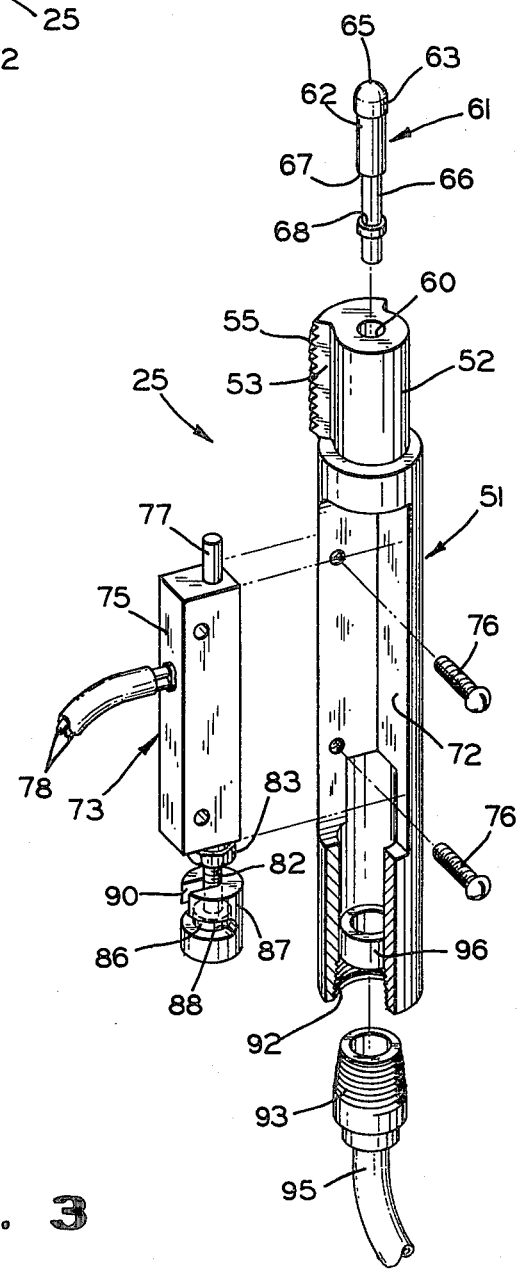
FIG. 4 is an exploded view of the sensing probe shown in FIG. 3.

A significant feature of this invention resides in the construction of the probe assemblies 25. As best shown in FIGS. 2 through 4, each probe assembly 25 comprises an elongated, generally cylindrical body or housing 51 having a reduced diameter head portion 52 adapted to be releasably secured within the associated insert 23. The head portion 52 is formed with an arcuate segment 53 having male threads 55 thereon adapted to engage with the female threads formed in the bore 24 of insert 23. However, because of the significantly lesser diameter of head portion 52 relative to the threaded bore 24 of insert 23, the former is simply moved axially vertically into its proper position within the bore 24 rather than threaded thereinto. When properly positioned, head portion 52 is moved laterally to engage the male threads 55 with the female threads of bore 24 and held in place by set screw 56 inserted laterally through aligned bores 57 and 58 in protrusion 21 and insert 23, respectively, and bearing against the outer cylindrical surface of head portion 52.

The head portion 52 of housing 51 is formed with an axial bore 60 for accommodating a sensing probe 61 movable for free axial movement therein. The probe 61 is formed with an elongated body 62 terminating at its upper end in an enlarged head 63 having a substantially semi-spherical glass engaging or sensing surface 65. The body 62 is formed with an intermediate, reduced diameter portion 66 defining opposed shoulders 67 and 68 at the opposite ends thereof. A detent in the form of a ball 70 is biased, as by means of a spring 71, against the reduced diameter portion 66 of probe 61 to limit axial movement thereof a distance determined by shoulders 67 and 68 under normal operating conditions. However, when desired to remove the probe element 61, a strong, axial, manual pull on the head 63 will overcome the bias of spring 71 to permit withdrawal of the probe 61 upwardly through bore 60.

Since the heads 63 of sensing probes 61 are exposed and thereby especially vulnerable to abuse and possible damage, the probes purposely are made self-contained for free axial movement within the housing 51 without in any way being attached to or enclosed within any other component for easy removal and/or replacement. Thus, a desirable feature herein incorporated is that a worn or damaged probe element can be readily replaced without dismantling or disturbing any of the associated structure otherwise required with conventional probe-sensor assemblies.

An elongated, arcuate cut-out section 72 is formed in body 51 intermediate its opposite ends for receiving a linear potentiometer 73 therein adapted to directly measure the precise position and/or deviation, if any, of a given point on the sheet to be checked relative to a reference position of the point or the desired location of such point of an ideal contour and then generate a signal corresponding to such position. The potentiometer includes a generally rectangularly shaped casing 75 mounted adjacent its opposite ends within the body housing 51 by suitable fasteners, such as screws 76. An axially movable plunger 77 is mounted within casing 75 and projects upwardly therefrom for engagement with the lower end of sensing probe 61. The plunger 77 is air-biased into its uppermost position and linear downward displacement thereof by downward movement of probe 61 is translated into an electric signal transmitted by a pair of conductors 78 to the controller 46 which, in turn, produces an output signal transmitted by a conductor 80 to a visual indicating mechanism 81 for displaying the data collected from each probe assembly, as will hereinafter be more fully explained.

The lower end of plunger 77 extends downwardly past casing 75 and is threaded, as shown at 82 in FIGS. 3 and 4, for receiving a lock nut 83 thereon bearing against a spacer 85 interposed between the bottom of casing 75 and nut 83. Thus, linear or axial adjustments of plunger 77 relative to its casing 75 can be made, as required or desired.

An enlarged formation 86 is provided on the lower end of plunger 77 for coaction with a piston 87 reciprocably mounted within the lower portion of housing 51. Piston 87 is provided with an arcuate slot 88 for receiving the enlarged formation 86 and a vertical slot 90 extending from arcuate slot 88 to the upper face of piston 87 for accommodating the threaded portion 82 of plunger 77. Thus, reciprocal movement of piston 87 carries the enlarged formation 86 and thereby plunger 77 therewith. The thickness of enlargement 86 is slightly smaller than the width of arcuate slot 88 to provide a small clearance for limited play therebetween to facilitate easy lateral insertion and removal of the plunger 77 into and from piston 87. With such a slotted piston arrangement, it can be appreciated that removal or replacement of the potentiometer 73 per se, can be readily effected without disturbing the sensing probe 61 or piston 87. This separable component assembly, which coacts and functions as a unit in operation, facilitates assembly and disassembly of the probe assembly 25, expedites component removal and/or replacement, and renders the device accessible for quick adjustments without having to remove the entire assembly from its mounting on the fixture 11 or without having to completely disassemble the device as is otherwise required with conventional probe assemblies.

The lower end of housing 51 constitutes a fluid pressure inlet and is internally threaded, as shown at 92 in FIGS. 3 and 4, for receiving the male coupling 93 of a conduit 95 for delivering air under pressure from a suitable source (not shown). The air under pressure delivered to the lower end of the housing 51 urges piston 87 upwardly to raise the enlarged formation 86 and thereby plunger 77 upwardly against the lower end of probe 61, lifting the latter to an extended position (FIG. 3) above the checking surface 30 of rail 28. A sleeve 96 is located adjacent the internally threaded portion 92 of housing 51 and serves as a seat for piston 87 in its lowered position.

One serious drawback in known prior art checking fixtures employing a series of displacement probes was that the several probes, which might number 32 for example, had to be frequently calibrated to assure the production of pieces within tolerable limits. Such probes were manually calibrated one at a time, requiring the services of two men, one axially adjusting the probe relative to the fixture and the other observing the indicator panel. It can be appreciated that this was an arduous, time-consuming task, adding materially to production costs. These shortcomings are eliminated by the inspection apparatus of the present invention in that all of the probe assemblies 25 are calibrated simultaneously in conjunction with the use of a master lite 100. The mode of initially calibrating the several probe assemblies 25 of checking fixture 11 is as follows:

With the platen 33 at its upper position and the control system 12 energized, a master lite 100 (FIG. 1), formed of a suitable fiberglass sheet material and having the desired contour conforming precisely to the contoured surface 30 of rail 28, is placed on the checking fixture 11. Placement of the master lite 100 on the upper surfaces 37 of rods 35 causes the lite 100 to also engage activator 43 to depress plunger 42 and actuate switch 41 which, via line 45, is connected to controller 46. The controller 46 is, in turn, electrically connected by line 102 to a control valve 101 for actuating the same and directing air under pressure to cylinder 38 for lowering piston rod 40 and thereby platen 33. As platen 33 is lowered beneath contoured surface 30, it deposits the master lite 100 onto surface 30 and continues to descend. When platen 33 reaches the end of its downstroke, it trips actuator 47 to close switch 48, which is connected via line 50 to controller 46. The controller 46, which is connected by line 103 to a control valve 105, is then operative to actuate the valve 105 and direct air under pressure through the several supply conduits 95 to probe assemblies 25. As best shown in FIG. 3, the air pressure acting against the underside of piston 87 of each probe assembly raises plunger 77 against the probe 61 to lift it and bring the tip thereof against the underside of master lite 100. All probe assemblies 25 are actuated substantially simultaneously establishing contact of their respective sensing probes 61 with the undersurface of master lite 100. A calibrating button on the console (not shown) of visual indicator 81 is then depressed to electronically set and establish those sensor positions as reference positions for the several probes, respectively. These reference positions can then be produced on the video screen of indicator 81 by actuation of suitable controls associated therewith. After a suitable time delay, control valve 105 becomes operative to evacuate the air pressure from beneath the pistons 87 of the several probe assemblies 25, allowing the pistons, along with probes 61, to descend by gravity into their lowered positions. Valve 101 also becomes operative to actuate cylinder 38 and raise platen 33 to its elevated position in readiness for the first glass piece to be inspected.

The operation of the checking fixture 11 and control system 12 in inspecting glass sheets is similar to that described above in connection with the calibration of the several probe assemblies 25, except that only half of the probe assemblies are actuated at a time to bring their respective probes into contact with the glass sheet, the other half being immediately actuated upon disengagement of the first half from the glass surface. The probe assemblies 25 can be divided into two sets or banks of probe assemblies comprised of say, odd numbered and even numbered assemblies, respectively, the banks being sequentially actuated within microseconds so as not to interfere with or retard production.

When the tips of the several probes 61 engage the underside of the glass sheet to be checked, the potentiometers 73 associated therewith generate electric signals commensurate with the extent of probe positioning. These signals are transmitted via line 78 to the micro-computer incorporated in controller 46 to convert such input signals into output signals transmitted by line 80 to the visual indicator 81 and displayed on the video screen thereof as indicia proportionate to the instantaneous values of the signals generated. A feature of this invention is that the data received from the various probe assemblies 25 and processed through the computer of controller 46 can be displayed on the screen in three different indicia forms, namely; the numeric, graphic, and trend modes as represented by numerals 81a, 81b and 81c in FIG. 1 and shown enlarged in FIGS. 5, 6 and 7, respectively.

Figure 5:
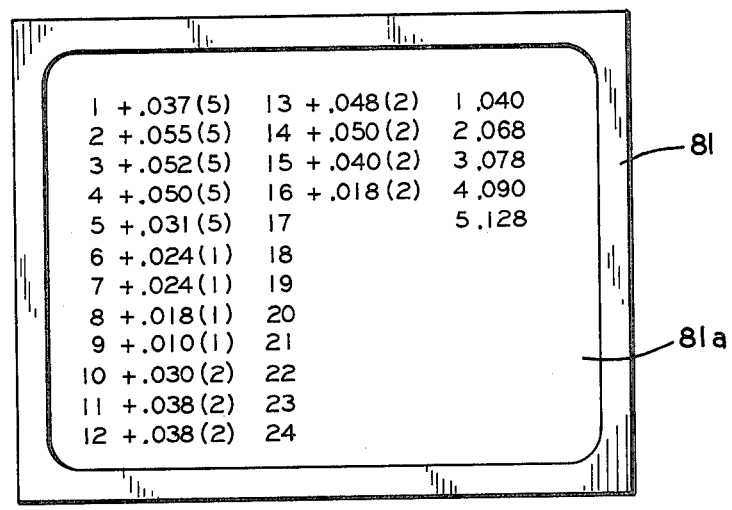
FIGS. 5, 6 and 7 are front elevational views of selective data shown on the video screen of a visual display apparatus used in conjunction with this invention.

In the numeric mode depicted at 81 a in FIG. 5, the data displayed on the screen depicts the numeric deviation, in thousandths of an inch, of each probe position from its calibrated position previously determined and established in computer-controller 46. In the exemplary embodiment shown, there are 16 readings (1–16) corresponding to the number of probe assemblies employed in fixture 11 of this embodiment. Of course, more or less than 16 probe assemblies with an equal number of readings can be utilized, as desired, within the purview of this invention. The indicia appearing in the right-hand column indicate the tolerance limits i.e. the amount of deviation allowed to be considered "on-form" or acceptable. Of course, deviations beyond these limits indicate the glass sheet being checked is "off-form" or unacceptable and will be rejected. The numerals appearing in parenthesis following the numerical deviations of the various probes is referenced to the right-hand column to ascertain the tolerance limits for such probes. For example, there is a +0.037 inch deviation of the vertical position of probe number 1 from its reference or calibrated position, which deviation falls within the acceptable tolerance limit of 0.128 inch established for such position. Thus, the numeric mode measures the precise deviation, to an accuracy of about 0.002 inch, of points spaced along the surface of the contoured glass sheet being checked from the reference points constituting the desired or ideal contour. If desired, an alarm can be incorporated in the system and energized when any probe detects a point on the sheet which is, for example, more than 70% outside the permissible deviation allowed for that point to alert the furnace operator so that corrective measures can be taken before unacceptable sheets are produced.

Figure 6:
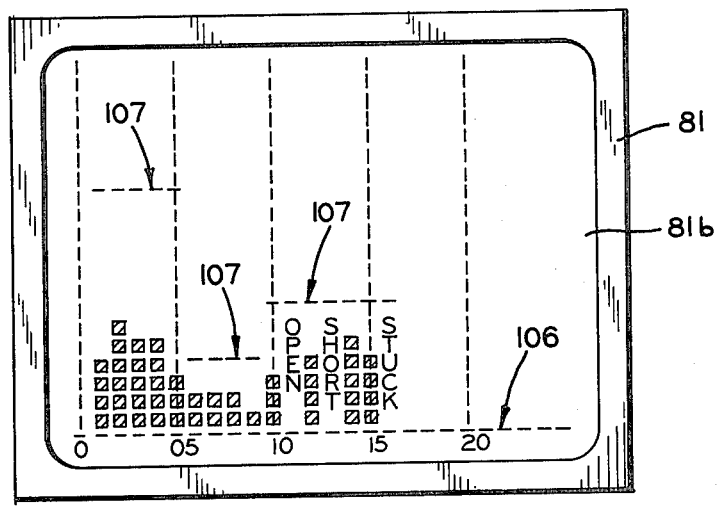
Figure 7:
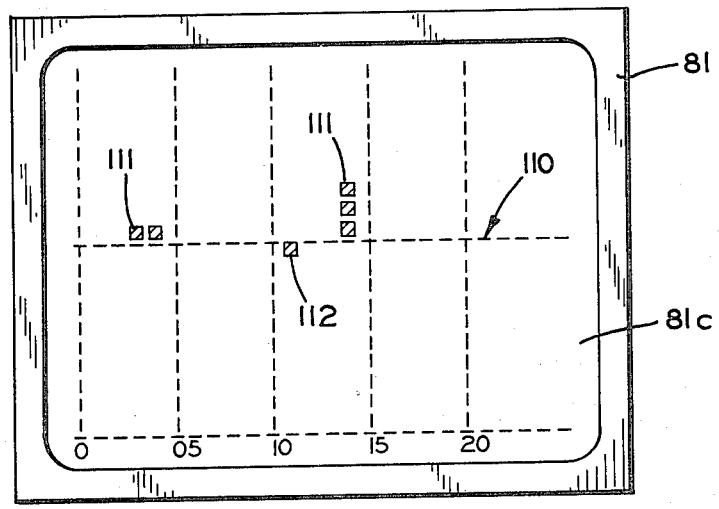

In the graphic mode shown at 81b in FIG. 6, the data displayed for each of the output signals derived from the corresponding probes is in the form of a vertical bar, the length thereof being proportionate to the instantaneous value of the corresponding signal. Each bar graphically represents the deviation of its associated probe from its calibrated reference point, the latter conforming to the ideal position for such probe as initially established by use of the master lite 100 and which is displayed as a grid point at the lower end of the screen. The reference grid points for the several probes are shown as a straight horizontal dashed line 106, which corresponds to the ideal or desired contour of the glass to be checked. The upper dashed lines 107 represent the deviation tolerance limits which vary along certain marginal portions of the glass. In addition to an audio alarm, suitable circuitry can be incorporated in the controller 46 to make any bar reaching a level above line 107, which indicates that the deviation of the associated probe has exceeded its acceptable limit, alternately appear and disappear to provide a visual flashing alarm to further alert the attendant and/or operator.

Another feature of the graphic mode resides in indicating an open or short circuit for each of the various probes when such conditions exist. These terms will literally appear on the screen as shown in FIG. 6, as well as the term "stuck" whenever a probe 61 is suspended within its housing in an intermediate position or otherwise mechanically malfunctions and cannot reach its extended position of use.

In the trend mode, the micro-computer embodies in controller 46 is capable of searching its memory to recall the average contour of any desired number of preceding checked sheets, say six sheets for example, and display this average contour as a reference level on the screen for comparison of a subsequent sheet to be checked relative thereto. This data display is especially important to the furnace operator for determining whether any furnace adjustments made to control or influence glass contour are correct. To illustrate, assume that the graphic display (FIG. 6) indicates that a number of successive sheets have shown a substantial, although acceptable, deviation from the desired contour. In response to such indication, the furnace operator makes certain furnace adjustments, such as altering the furnace temperature or furnace conveyor speed for example, in an effort to compensate for such deviations and shape subsequent sheets closer to form. When the first sheet processed after such adjustment is being inspected, the operator can actuate a switch tuning in the trend display shown at 81c in FIG. 7. The horizontal dashed line 110 constitutes the reference level that corresponds to the average contour of the previous six sheets checked, regardless of the extent of their deviation from the ideal contour. Any grid markings above the reference line 110, such as that shown at 111, indicate that the associated points on the sheet being checked are moving further in the direction of the trend or further away from the desired position while grid markings below the reference line, such as shown at 112, indicate that the associated point on the sheet is moving away from the trend or approaching the desired position i.e. moving closer to form. In the specific display illustrated, the measured points of probe positions 3 and 4 are gradually moving further in the direction of the trend away from the ideal or calibrated positions and at probe position 14 is rapidly moving away therefrom while the measured point at probe position 11 is out of phase with the trend and approaching the ideal or calibrated position. This comparison informs the operator whether the furnace adjustments previously made were proper or whether further corrective measures must be taken.

From the foregoing, it is apparent that the objects of the invention have been fully accomplished. As a result of this invention, an improved inspection apparatus is provided for determining the precise contour of a sheet material and the extent of conformity thereof to an ideal contour. The individual probe assemblies are formed of a plurality of components that function as a unit in sensing the position of a point on the sheet material but can be separately detached and removed from the assembly without disturbing any of the other components and without having to completely disassemble the device or detach the same from its mounting on the checking fixture. Moreover, all the probe assemblies can be simultaneously calibrated to significantly reduce production down time and the labor involved. Also, the information derived from the probe assemblies can be selectively displayed on a video screen in a plurality of different forms to not only enhance precise contour measurements but also to alert an operator to corrective measures that can be taken to increase yields.

It is to be understood that the form of the invention herewith shown and described is to be taken as an illustrative embodiment only of the same, and that various changes in the shape, size and arrangement of parts may be resorted to without departing from the spirit of the invention.

We claim:

1. A probe assembly for use in a sheet contour inspecting apparatus comprising: an elongated body having at one end thereof a head portion provided with an axial bore therethrough, a removable probe disposed in said bore for axial movement therein, said probe having a sensing head at one end thereof protruding outwardly of said bore and engageable with a sheet to be checked, electric means releasably secured within said body for sensing the position of said probe and including means for generating an electrical signal proportionate to the axial position of said probe, said body having a cut-out section intermediate the opposite ends thereof for providing access to said sensing means, said sensing means including a reciprocal plunger coaxially aligned with said probe and engageable at one end thereof with the other end of said probe for movement, as a unit, therewith, a movable piston mounted within said body adjacent the other end thereof, the other end of said plunger extending into said piston, said piston being formed with a slot permitting lateral withdrawal of said plunger other end from said piston when withdrawing said sensing means through said cut-out section for easy removal and replacement.

2. A probe assembly according to claim 1, wherein said body other end is provided with an inlet for connection to a supply of fluid under pressure.

3. A probe assembly according to claim 1, wherein said plunger is provided with an enlarged formation at said other end thereof and said piston is formed with a second slot formation receiving said plunger enlarged formation.

4. A probe assembly according to claim 1, including means for limiting axial movement of said probe within said bore.

5. A probe assembly according to claim 1, wherein said sensing means comprises a linear potentiometer.

6. A probe assembly according to claim 1, in combination with control means for converting said signal into display indicia commensurate with the magnitude of said signal.

7. The combination according to claim 6, wherein said control means includes means for selectively displaying said indicia in different selective forms.

8. A plurality of probe assemblies according to claim 1, in combination with a contour checking fixture comprising a base member having a top wall provided with a contoured surface conforming to the ideal contour desired, and a plurality of spaced openings in said top wall and said contoured surface for accommodating said probe assemblies, respectively.

9. The combination according to claim 8, including an insert fitted into each of said top wall openings and having a threaded bore therethrough, said body head portion having an arcuate segment formed with threads engageable with the threads of said insert bore for selective axial positioning of said body within said insert.

10. The combination according to claim 9, including means securing said body in a selected axial position within said insert.

11. Apparatus for checking the contour of sheet material comprising: a fixture having a rail formed with a contoured surface conforming to the ideal contour desired, a plurality of spaced probe assemblies mounted on said fixture, each of said assemblies having a probe extensible through an opening in said contoured surface for engagement with a sheet, means for supporting said sheet above said contoured surface, means responsive to the placement of a sheet on said supporting means for lowering the same to deposit said sheet on said contoured surface, means for moving said probes into contact with said sheet, said probe assemblies including electrical sensing means for generating electrical signals corresponding to the positions of the associated probes thereof, each said probe assembly having a body housing said probe and said sensing means and formed with a cut-out section providing access to said sensing means for lateral withdrawal thereof from said body through said cut-out section for easy removal and replacement, and control means converting said several electrical signals of said probe assemblies into display indicia commensurate with the magnitudes of said signals.

12. Apparatus according to claim 11, wherein said control means includes means for selectively displaying said indicia in different selective forms.

13. Apparatus according to claim 11, wherein said sensing means are adapted to generate a first series of electrical signals corresponding to the positions of said probes when engageable with a master sheet positioned on said contoured surface to simultaneously establish reference positions for said probes.

14. Apparatus according to claim 13, wherein said sensing means are adapted to generate a second series of electrical signals corresponding to other positions of said probes when engageable with a sheet to be checked positioned on said surface for comparison with said first series of electrical signals to determine the deviation between said reference positions and said other positions.

15. Apparatus according to claim 14, wherein said control means converts said first and second series of electrical signals into display indicia commensurate with the magnitude of said signals, respectively.

16. Apparatus according to claim 15, wherein said indicia is in the form of numerical characters.

17. Apparatus according to claim 15, wherein said indicia is in the form of graphic representations.

18. Apparatus according to claim 15, wherein said control means is operable to display indicia in the form of a graphic representation of the contour of the sheet being checked relative to the graphic representation of a contour trend established for a given number of previously checked sheets.

19. Apparatus according to claim 11, wherein said sensing means of each of said probe assemblies includes a reciprocal plunger coaxially aligned with said probe and engageable therewith for movement, as a unit, with said probe.

20. Apparatus according to claim 11, wherein each of said probe assemblies includes an elongated body releasably secured on said fixture, said probe and said sensing means of each probe assembly being removably mounted within said body.

* * * * *